US010469323B2

(12) United States Patent
Toillon et al.

(10) Patent No.: US 10,469,323 B2
(45) Date of Patent: Nov. 5, 2019

(54) HYBRID ARCHITECTURE FOR AVIONICS DATA TRANSMISSION AND CORRESPONDING SYSTEM

(71) Applicant: THALES, Courbevoie (FR)

(72) Inventors: Patrice Georges Paul Toillon, Velizy Villacoublay (FR); David José Faura, Velizy Villacoublay (FR); Paul Marie Boivin-Champeaux, Velizy Villacoublay (FR); Vincent Christophe Cédric Sollier, Velizy Villacoublay (FR)

(73) Assignee: Thales, Courbevoie (FR)

( * ) Notice: Subject to any disclaimer, the term of this patent is extended or adjusted under 35 U.S.C. 154(b) by 110 days.

(21) Appl. No.: 15/003,603

(22) Filed: Jan. 21, 2016

(65) Prior Publication Data
US 2016/0218930 A1   Jul. 28, 2016

(30) Foreign Application Priority Data
Jan. 22, 2015 (FR) ...................................... 15 00125

(51) Int. Cl.
*H04L 12/24* (2006.01)
*H04L 5/14* (2006.01)
*H04L 29/08* (2006.01)
*H04L 12/42* (2006.01)
*H04L 12/44* (2006.01)
*H04L 12/931* (2013.01)

(52) U.S. Cl.
CPC ................ *H04L 41/12* (2013.01); *H04L 5/14* (2013.01); *H04L 12/42* (2013.01); *H04L 12/44* (2013.01);
(Continued)

(58) Field of Classification Search
CPC ..... H04L 67/303; H04L 67/322; H04L 67/40; H04L 69/40; H04L 12/40006;
(Continued)

(56) References Cited

U.S. PATENT DOCUMENTS

2008/0025208 A1* 1/2008 Chan ....................... H04L 12/42
370/217
2008/0030079 A1   2/2008 Poroseva et al.
(Continued)

OTHER PUBLICATIONS

Syao Debao et al., Performance study of a star-ring local network, Automatic control and computer sciences, vol. 25, No. 3, pp. 37-42, Jan. 1, 1991, Allerton Press Inc., New York, US.*
(Continued)

*Primary Examiner* — Jeffrey M Rutkowski
*Assistant Examiner* — Chae S Lee
(74) *Attorney, Agent, or Firm* — Knobbe, Martens, Olson & Bear, LLP

(57) ABSTRACT

A hybrid architecture for avionics data transmission and a corresponding system are disclosed. In one aspect, the architecture includes a plurality of subscriber stations connected by a data transmission capability. The stations are connected on the one hand by a first capability for transmitting data to their neighbors to form at least a first data transmission network in a closed ring between the stations and on the other hand by a second capability for transmitting data to a capability forming a central communication plan switch to form at least one second data transmission network in a star between the stations and the capability forming the central plan switch.

11 Claims, 5 Drawing Sheets

(52) U.S. Cl.
CPC ............ *H04L 67/12* (2013.01); *H04L 49/351* (2013.01); *H04L 2012/421* (2013.01)

(58) Field of Classification Search
CPC ..... H04L 12/4015; H04L 12/42; H04L 12/44; H04L 12/4625; H04L 12/66; H04L 1/0041; H04L 1/0061; H04L 1/008; H04L 2012/421; H04L 41/12; H04L 5/14; H04L 67/12; H04L 49/351
See application file for complete search history.

(56) References Cited

U.S. PATENT DOCUMENTS

| | | | |
|---|---|---|---|
| 2008/0232803 A1* | 9/2008 | Maier ................ | H04Q 11/0062 398/59 |
| 2009/0041040 A1 | 2/2009 | Hall et al. | |
| 2009/0323704 A1* | 12/2009 | Hall ........................ | H04L 12/42 370/401 |
| 2016/0065355 A1* | 3/2016 | Kenney ..................... | H04L 5/16 370/276 |
| 2016/0154391 A1* | 6/2016 | Pavaskar ................ | G05B 15/02 701/3 |

OTHER PUBLICATIONS

Search Report dated Dec. 10, 2015 for French Patent Application No. 1500125, filed Jan. 22, 2015.

* cited by examiner

HYBRID ARCHITECTURE FOR AVIONICS DATA TRANSMISSION AND CORRESPONDING SYSTEM

CROSS-REFERENCE TO RELATED APPLICATIONS

This patent application claims the benefit under 35 U.S.C. § 119 of French Application No. FR 15 00125 filed on Jan. 22, 2015 which is hereby incorporated by reference in its entirety.

BACKGROUND

Technological Field

The described technology relates to a hybrid architecture for avionics data transmission and a hybrid transmission system including such architectures.

Description of the Related Technology

The present application therefore falls within the context of avionics communication networks, and in particular, but not exclusively, those based on the concept of integrated modular avionics (IMA).

This concept requires the implementation of shared processing resources supporting one or more software programs as well as shared communication resources and shared input/output resources.

Such a concept then calls on spatial and temporal partitioning properties allowing independent and deterministic data processing operations and exchanges.

This is for example based on standards such as A653 and A664, well known in the standard technology.

A corresponding avionics architecture based on the concept of IMA must provide generic computing platforms (computers) where one or more software programs run making it possible to ensure the performance of avionics functions, safe operations and safety of the aircraft.

Furthermore, this architecture must provide the applications with standardized communication services in the form of a main avionics network (for example, under standard A664), able to convey any type and size of data, and one or more secondary avionics networks (of the ADC bus, A429, etc. type) able in particular to be used as a backup network and/or to convey so-called critical data.

In the case of the primary network, the communication service must allow access to and sharing of the communication resources, through the use of an end-point system (ES), which allows the applications of the computer to access the network, made up of a set of interconnected switches, which convey messages only to the receiving applications.

However, avionics systems have very strong real-time constraints.

The communication architecture must implement mechanisms to ensure that the data sent between two applications is available, is sent within a maximum allotted time and has maintained its integrity.

Thus, one objective of the described technology is to propose an architecture that makes it possible to best respond to these different imperatives.

SUMMARY OF CERTAIN INVENTIVE ASPECTS

To that end, one inventive aspect relates to a hybrid architecture for transmitting avionics data, of the type including subscriber stations connected by a data transmission capability, wherein the stations are connected on the one hand by a first capability for transmitting data to their neighbors to form at least a first data transmission network in a closed ring between the stations and on the other hand by a second capability for transmitting data to a capability forming a central communication plan switch to form at least one second data transmission network in a star between the stations and the capability forming the central plan switch.

According to other aspects of the architecture, considered alone or in combination:

each station includes a capability for subscribing to the first and second networks comprising at least four communication ports, one of which is connected to resources of the station, two to the adjacent stations in the first, ring network and one to the plan switch-forming capability in the second, star network;

the subscription capability of the station include a capability for distributing information produced by the resources of that station, to a port or some or all of the ports of the subscription capability of that station;

the networks are full duplex networks;

the ring and star data transmission networks implement identical communication protocols;

the ring and star networks implement different communication protocols;

the ring and star data transmission networks implement identical physical layers;

the ring and star networks implement different physical layers;

the architecture includes at least two capabilities forming a star connecting switch of the stations to form at least one second star network between the stations and each of the switch-forming capabilities;

the networks are adapted to transmit data of different natures, including critical data;

at least one of the networks is a backup network for another network;

the switch-forming capability comprises a capability for pacing the operation of the subscribing stations.

Another aspect relates to a hybrid system for avionics data transmission, wherein it includes at least two hybrid architectures as previously described, associated with one another.

According to other aspects of the system, considered alone or in combination:

the architectures are associated at least at one of their switch-forming capabilities;

the architectures are associated at least at one of their stations.

BRIEF DESCRIPTION OF THE DRAWINGS

The described technology will be better understood using the following description, provided solely as an example and done in reference to the appended drawings, in which.

DETAILED DESCRIPTION OF CERTAIN INVENTIVE EMBODIMENTS

One objective of the described technology is therefore to propose a scalable hybrid network architecture solution, which is both distributed and centralized.

At least one solution must also allow communication between one or more avionics applications, irrespective of the location of the application(s) in the avionics system.

The described technology, owing to the association of two communication structures of different types, i.e., centralized and distributed, is able to be applied to similar or dissimilar physical and software layers, and owing to these data transmission mechanisms, and gives this hybrid network architecture both the advantages of centralized architectures and those of distributed architectures.

Accordingly, at least one embodiment provides an optimal response to the communication needs of avionics systems.

Figure 1:
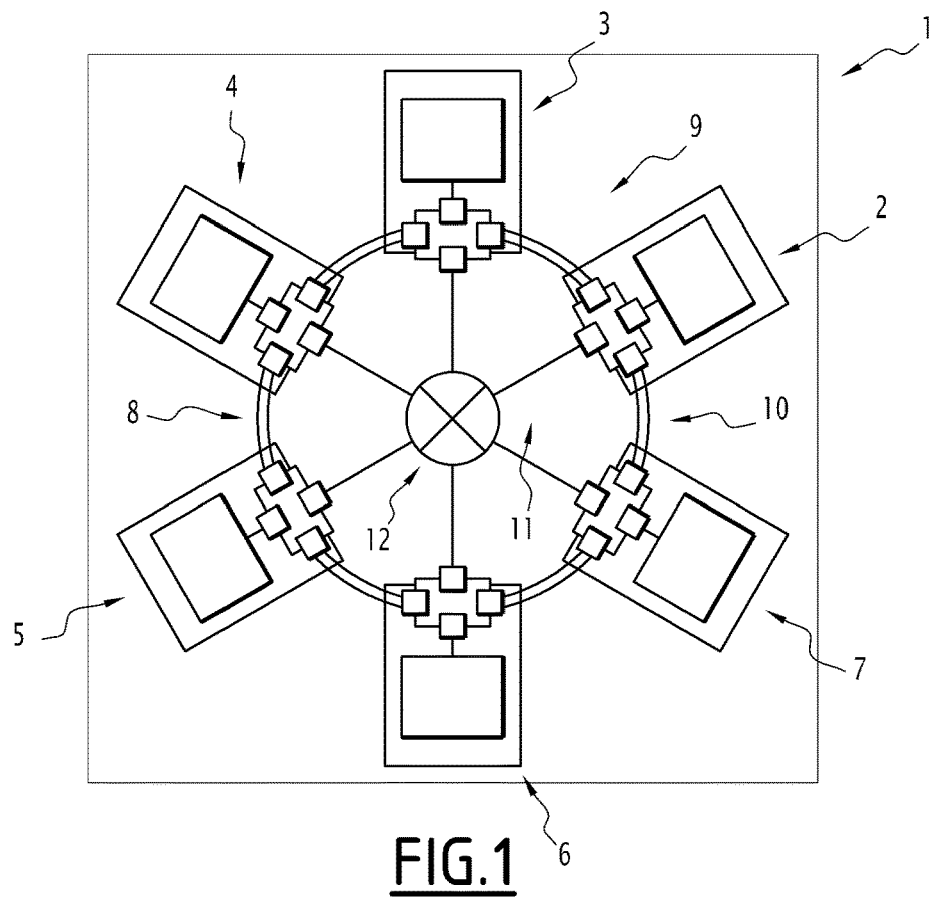
FIG. 1 shows a general view of a hybrid architecture according to an embodiment.

FIG. 1 shows an example embodiment of one such hybrid architecture.

This architecture is designated by general reference 1 in this figure, and one can see that it includes several subscribing stations, designated by references 2, 3, 4, 5, 6 and 7, respectively.

The stations are connected by a data transmission capability designated by general reference 8.

Indeed and as illustrated, the stations 2 to 7 are connected on the one hand by a first data transmission capability, to their neighbors, to form at least one first data transmission network in a closed ring between the stations, and on the other hand by a second data transmission capability, to a central communication plan switch-forming capability, to form at least one second data transmission network in a star between the stations and the central plan switch-forming capability.

In this FIG. 1, the stations, such as the station 2 for example, are connected to their neighbors, for example the stations 3 and 7, by a first data transmission capability, designated by general references 9 and 10, respectively, for example, to form at least one first data transmission network in a closed ring (or loop) between the different interconnected stations.

Furthermore, the stations, for example such as the station 2, are also connected by a second data transmission capability for example designated by general reference 11, to central communication plan switch-forming capability, one of which is designated by general reference 12 in this FIG. 1, to form at least one data transmission network in a star between the stations 2 to 7 and these capabilities forming a central communication plan switch, designated by general reference 12.

The combination of these two communication domains, i.e., the peripheral ring domain and the central star domain, thus forms an avionics communication plan to which each subscribing avionics station or piece of equipment is connected.

Each communication domain is independent of the other and has its own autonomy and its own mathematical temporal model.

The central communication domain is for example based on a frame switch-based communication technology, using one or more pieces of dedicated avionics equipment of the switch type or one or more avionics subassemblies of the distributed switch type, acting as centralized intermediary systems.

The topology of the domains is therefore centralized or in a star and the central communication domain is for example based on a standard such as ARINC 664 or Ethernet IEEE 802.3.

This central communication domain is based on the controlled propagation of frames.

Depending on the uptime objectives of the supported avionics systems, the central communication domain can be redundant, the central domain providing the direct interconnection between the subscribing stations.

The peripheral domain, made up of the closed ring network, is for example, based on a frame circulation communication technology calling on mechanisms of the circulator or elementary switch type distributed and installed in each of the pieces of subscribing avionics equipment.

This peripheral communication domain is based on a closed topology, for example in a loop or ring, and on the systematic and controlled propagation of frames with a strong dissociation between each of the two domains (principles of emission, filtering, etc.) resulting in a mathematical temporal model different from that of the central domain.

The peripheral communication domain can be based on a standard of the ARINC 664 or Ethernet IEEE 802.3 type, allowing a direct and controlled association, without frame modification within a communication plan, resulting in end-to-end exchanges, without modifying frames for the supported systems.

However, out of a desire to increase the distance between the two communication domains, the peripheral domain could for example be of another type (point-to-point serial link, etc.).

The communication between the different avionics communication plans, irrespective of whether they are located in different physical zones of the aircraft, is done at the frames. The association between different avionics communication plans is done by direct links between the switches of each of the communication plans via physical communication ports having complementary mechanisms and capacities.

The communication between central switches is done without frame modification, from one communication plan to another, based on a principle of controlled frame propagation.

Thus, these mechanisms and capacities for example implement a more significant intermediate frame storage capability in both circulation directions, as well as monitoring/filtering mechanisms providing the monitoring/isolation upon passage by an avionics communication plan from the other avionics communication plans, in both directions.

In case of non-authorization or excessive age, the associated frame is not inserted into the other communication plan with the indication of such a situation.

Figure 2:
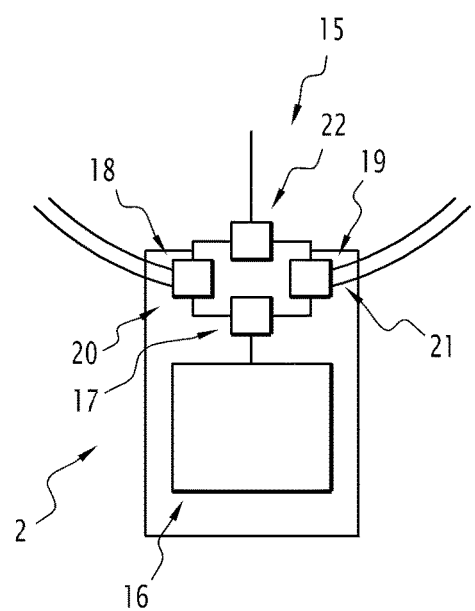
FIG. 2 shows a detailed view of a capability for connecting a station included in the makeup of such an architecture.

As illustrated in FIG. 2, each station includes a capability for subscribing to the first and second networks.

These subscription capabilities for example comprise at least four communication ports.

In this FIG. 2, the station is for example the station designated by general reference 2 in FIG. 1, and it for example includes subscription means designated by general reference 15.

As previously indicated, the station includes resources, for example a computer 16 (or any other resources), and one of the communication ports of the subscribing capability, for example made up of the port designated by general reference 17, is associated with this computer or any other resource of the station.

Two other ports 18 and 19, respectively, are associated with the adjacent stations in the first ring network, owing to the connecting capability, for example 20 and 21.

Lastly, another port, for example the port 22, is in turn associated with the plan switch-forming capability in the second star network.

One can then see that such a structure has a certain number of advantages and that different operating modes of these different elements can be considered.

Thus, for example, the subscribing capability of the station can include a capability for distributing data produced by the resources of that station to a port or some or all of the ports of these subscribing capabilities of this station.

Thus, the distribution of the frames can be fully monitored and managed.

It should be noted that the networks can be Full Duplex networks and that these data transmission networks, in a ring or star, can implement identical or different communication protocols and use identical or different hardware layers.

One can thus for example find wired or non-wired connecting capabilities, etc.

One can see that these networks can be adapted to transmit data of different types, for example including critical data, and that at least one of the networks can, for example, be a backup network for another of these networks.

As previously indicated, the pacing of the operation of different stations can be monitored.

This monitoring can for example be done via a capability forming a central plan switch, which can include a capability for generating pacing signals for the operation of the subscribing stations.

These signals are thus for example sent to the stations from these switch-forming capabilities.

Figure 3:
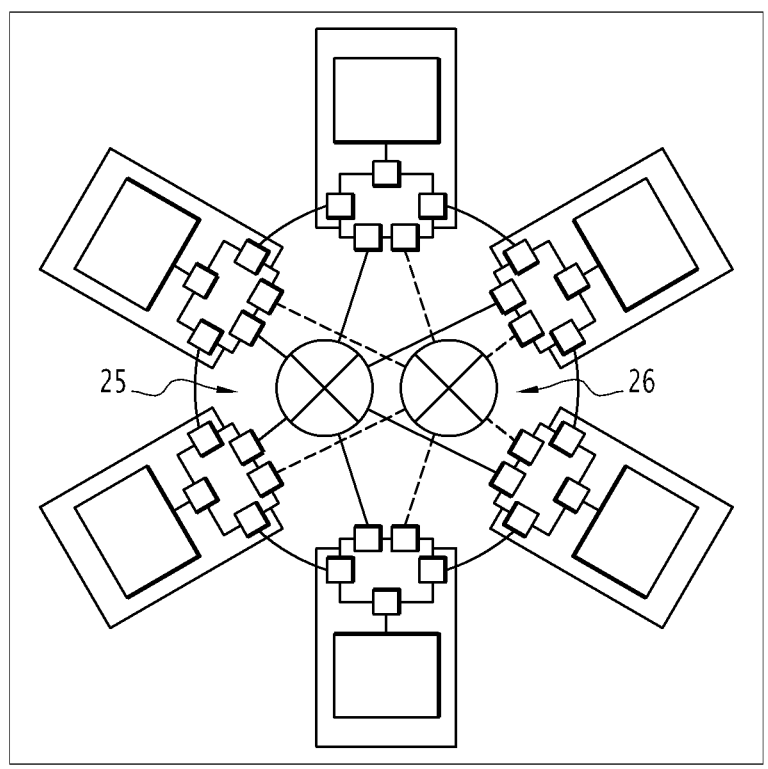
FIG. 3 shows an alternative embodiment of an architecture according to an embodiment.

As shown in FIG. 3, it is also possible to use at least two switch-forming capabilities for connecting the stations in a star.

These two switch-forming capabilities are adapted to form at least one second star network between the stations and each of these capabilities forming a switch in parallel with the first star network.

In this FIG. 3, the switch-forming capabilities are designated by references 25 and 26, respectively, and the stations are then connected to each of these two switch-forming capabilities, in a configuration with two second star networks.

Figure 4:
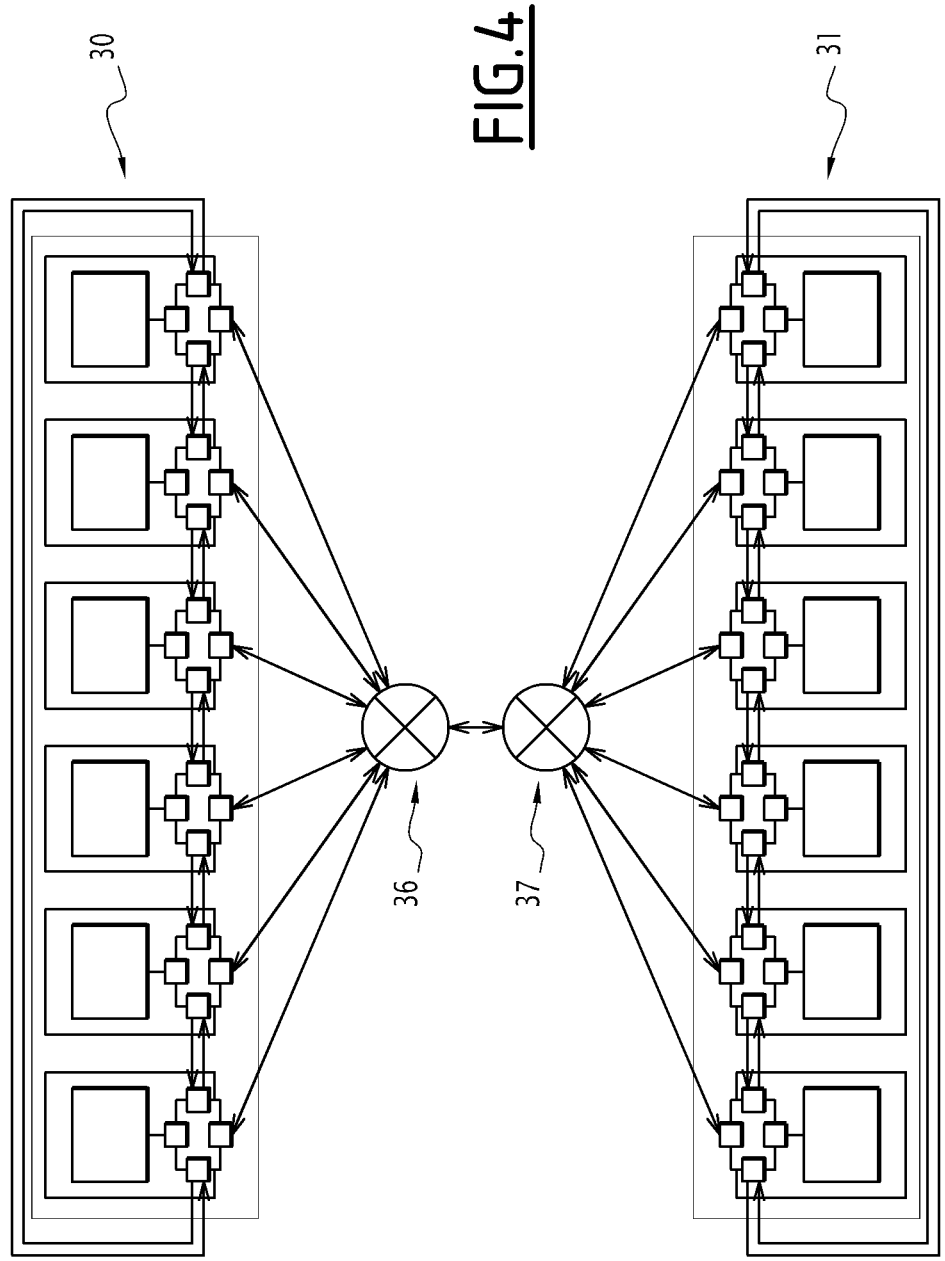
FIG. 4 illustrates the connection of two architectures as described, in a hybrid system according to an embodiment.
Figure 5:
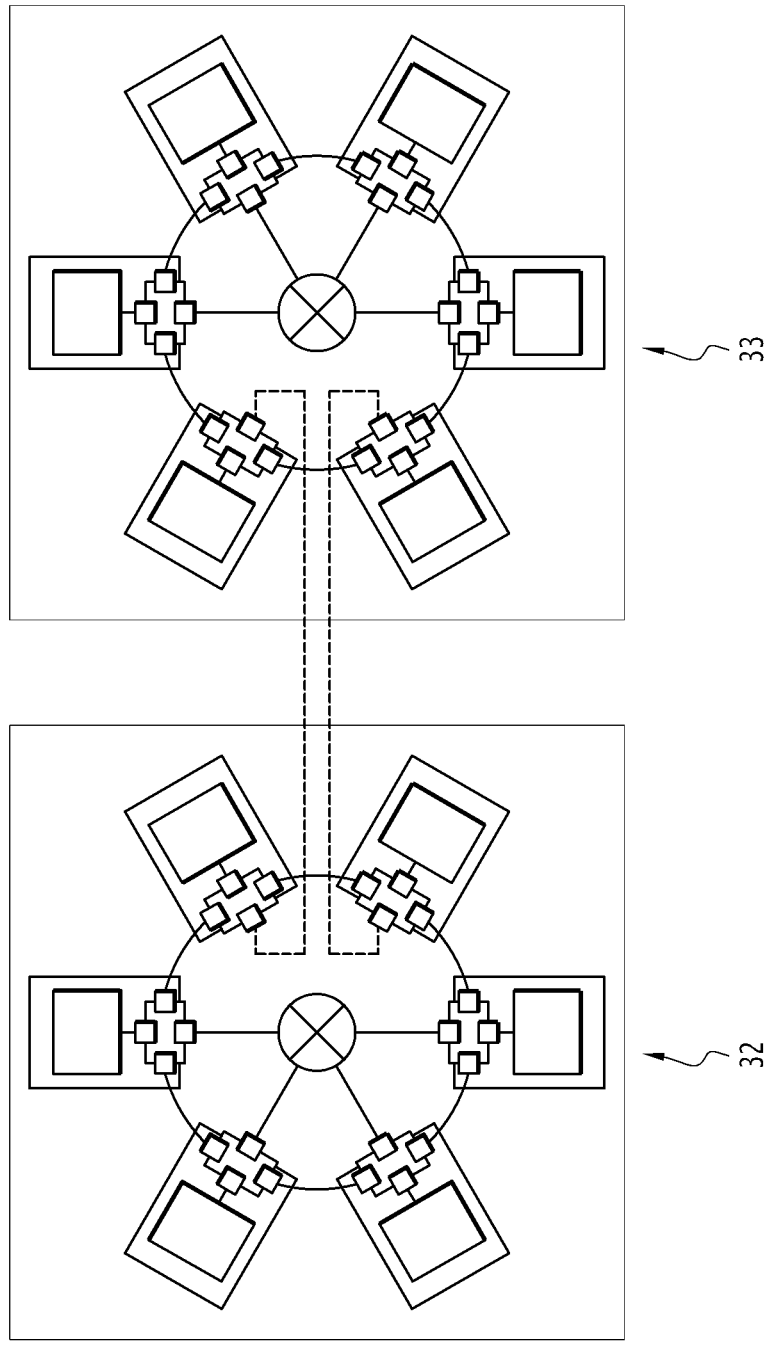
FIGS. 5 and 6 are block diagrams illustrating two alternative embodiments of such a system.
Figure 6:
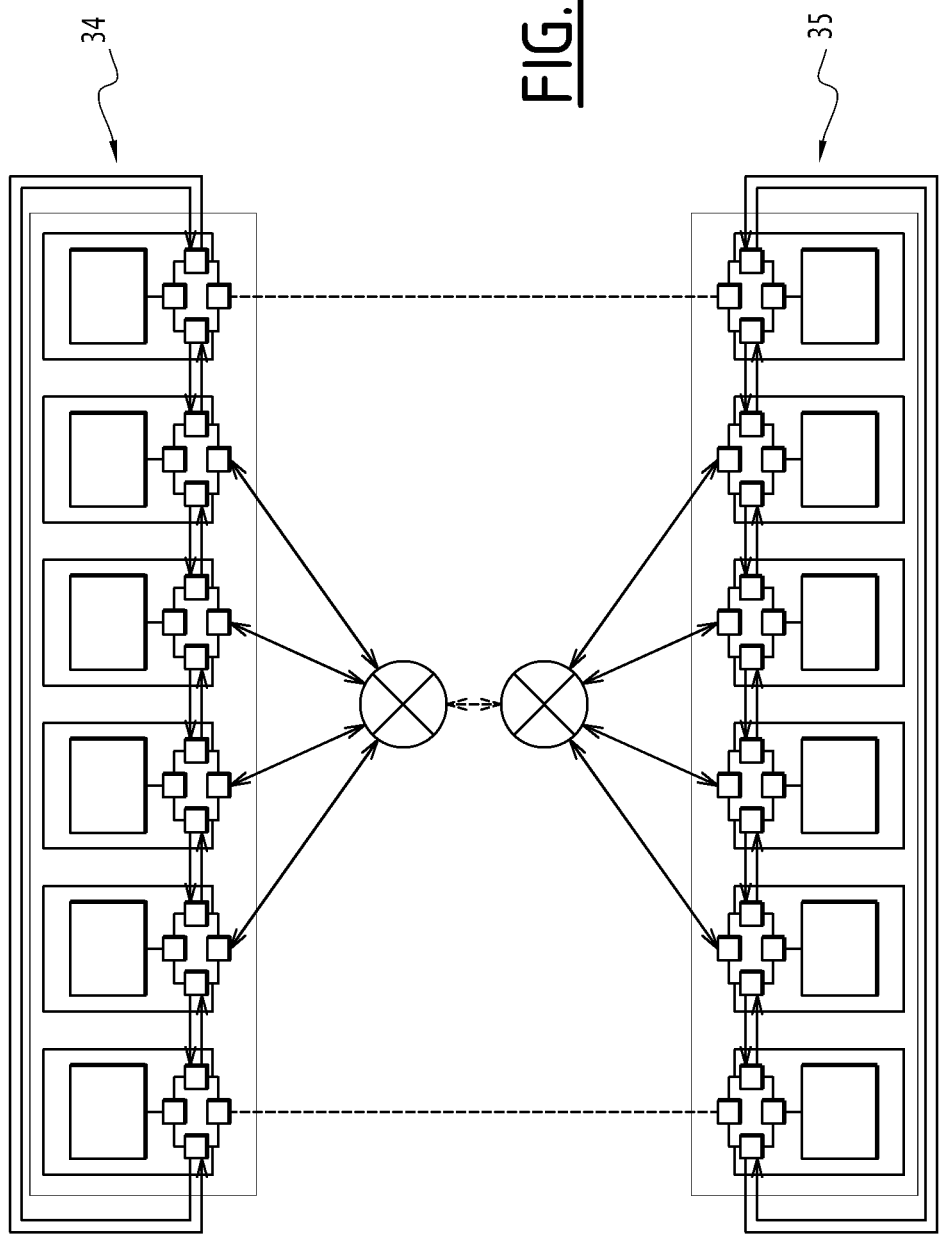

FIGS. 4, 5 and 6 are different possible embodiments of hybrid systems for avionics data transmission, which include at least two hybrid architectures as previously described, associated with one another.

These FIGS. 4, 5 and 6 indeed show hybrid architectures designated by references 30 and 31, respectively, in FIGS. 4; 32 and 33 in FIG. 5; and 34 and 35 in FIG. 6.

In FIG. 4, the hybrid architectures 30 and 31 are associated at their central plan switch-forming capabilities, as designated by reference 36 and 37.

FIGS. 5 and 6 show two alternative embodiments, in which the hybrid architectures are associated at least at one of their stations and at least one of their stations and their communication plan switch-forming capabilities, respectively. These figures also show embodiments of multiple communication plan architectures, for example for what is called a cabinet in the avionics field.

One can then see that such an architecture and system structure is particularly interesting inasmuch as it is a hybrid structure that may for example be a multi-communication plan structure, that is both robust and scalable.

It is possible to implement two symmetrical or different structures, or on the contrary symmetrical and identical structures, in both networks, and an avionics system implementing this design can for example have an integrated backup network.

The communication plan also simplifies the organization of the communications and their association and increases the availability of the data relative to any other traditional network.

Of course, other embodiments of this architecture could also be considered.

In the present description, each data transmission capability is, for example, a network connection, the capability forming the central plan switch is, for example, a central plan switch, the subscription capability is, for example, a subscriber, the capability for distributing information is, for example, a distributor, the two capabilities forming a star connecting switch are, for example, star connecting switches, and the capability for pacing is, for example, a clock.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A hybrid system for avionics data transmission comprising at least two hybrid architectures associated with one another, each of the hybrid architectures for transmitting avionics data comprising:
   a plurality of subscriber stations connected by a data transmission capability,
   wherein the stations are connected by a first capability for transmitting data to their neighboring stations to form at least a first data transmission network in a closed ring between the stations and by a second capability for transmitting data to a capability forming a central communication plan switch to form at least one second data transmission network in a star between the stations and the capability forming the central plan switch,
   wherein each of the subscriber stations is connected directly to: i) the capability forming the central plan switch by the second capability for transmitting data, or ii) a data transmission network, different from the first and the second data transmission networks, by an external capability for transmitting data,
   wherein each of the first and second data transmission networks is a full duplex network,
   wherein the first and second data transmission networks simultaneously implement different communication protocols,
   wherein the architectures are associated at least at one of their central plan switch-forming capabilities, and wherein the communication between central plan switch-forming capabilities of the at least two hybrid architectures occurs without frame modification.

2. The system according to claim 1, wherein, for each hybrid architecture, the first data transmission network forms a peripheral ring domain and the second data transmission network forms a central star domain, the communication domains being independent of each other.

3. The system according to claim 1, wherein, for each hybrid architecture, each station includes a capability for subscribing to the first and second networks comprising at least four communication ports, one of which is connected to resources of the station, two of which are connected to the adjacent stations in the first ring network and one of which is connected to the plan switch-forming capability in the second star network.

4. The system according to claim 3, wherein, for each hybrid architecture, the subscription capability of the station include a capability for distributing information produced by the resources of that station, to a port or some of all of the ports of the subscription capability of that station.

5. The system, according to claim 1, wherein, for each hybrid architecture, the ring and star data transmission networks implement identical physical layers.

6. The system according to claim 1, wherein, for each hybrid architecture, the ring and star networks implement different physical layers.

7. The system according to claim 1, wherein, for each hybrid architecture, the architecture includes at least two capabilities forming a star connecting switch of the stations to form at least one second star network between the stations and each of the switch-forming capabilities.

8. The system according to claim 1, wherein, for each hybrid architecture, the networks are adapted to transmit data of different natures, including critical data.

9. The system according to claim 1, wherein, for each hybrid architecture, at least one of the networks is a backup network for another network.

10. The system according to claim 1, wherein, for each hybrid architecture, the switch-forming capability comprises a capability for pacing the operation of the subscribing stations.

11. The system according to claim 1, wherein the architectures are associated at least at one of their stations.

* * * * *